United States Patent
Qian et al.

(10) Patent No.: US 9,042,629 B2
(45) Date of Patent: May 26, 2015

(54) IMAGE CLASSIFICATION BASED ON IMAGE SEGMENTATION

(75) Inventors: Yuechen Qian, Briarcliff Manor, NY (US); Dieter Geller, Aachen (DE); Reinhard Kneser, Aachen (DE); Merlijn Sevenster, Eindhoven (NL); Robbert C. Van Ommering, Hapert (NL); Paola K. Tulipano, Brooklyn, NY (US)

(73) Assignee: Koninklijke Philips N.V., Eindhoven (NL)

( * ) Notice: Subject to any disclaimer, the term of this patent is extended or adjusted under 35 U.S.C. 154(b) by 1095 days.

(21) Appl. No.: 12/992,190

(22) PCT Filed: May 8, 2009

(86) PCT No.: PCT/IB2009/051894
§ 371 (c)(1),
(2), (4) Date: Jun. 1, 2011

(87) PCT Pub. No.: WO2009/138925
PCT Pub. Date: Nov. 19, 2009

(65) Prior Publication Data
US 2011/0222747 A1 Sep. 15, 2011

Related U.S. Application Data

(60) Provisional application No. 61/053,123, filed on May 14, 2008.

(51) Int. Cl.
*G06K 9/00* (2006.01)
*G06K 9/62* (2006.01)
*G06T 7/00* (2006.01)

(52) U.S. Cl.
CPC .......... *G06K 9/6267* (2013.01); *G06K 2209/05* (2013.01); *G06T 7/0012* (2013.01);
(Continued)

(58) Field of Classification Search
USPC ........................................................ 382/128
See application file for complete search history.

(56) References Cited

U.S. PATENT DOCUMENTS

| 8,478,023 B2 | 7/2013 | Kaus et al. | |
| 2002/0186874 A1* | 12/2002 | Price et al. | 382/133 |
| 2003/0095692 A1* | 5/2003 | Mundy et al. | 382/128 |

(Continued)

FOREIGN PATENT DOCUMENTS

| JP | 2007317034 A | 12/2007 |
| KR | 2001008933 A | 2/2001 |

(Continued)

OTHER PUBLICATIONS

Lehmann, T. M., et al.; Content-Based Image Retrieval in Medical Applications: A Novel Multi-Step Approach; 1999; Proc. SPIE; vol. 3972; pp. 312-320.

(Continued)

*Primary Examiner* — Hadi Akhavannik

(57) ABSTRACT

The invention relates to a system (100) for classifying image data on the basis of a model for adapting to an object in the image data, the system comprising a segmentation unit (110) for segmenting the image data by adapting the model to the object in the image data and a classification unit (120) for assigning a class to the image data on the basis of the model adapted to the object in the image data, thereby classifying the image data, wherein the classification unit (120) comprises an attribute unit (122) for computing a value of an attribute of the model on the basis of the model adapted to the object in the image data, and wherein the assigned class is based on the computed value of the attribute. Thus, the system (100) of the invention is capable of classifying the image data without any user input. All inputs required for classifying the image data 10 constitute a model for adapting to an object in the image data. A person skilled in the art will understand however that in some embodiments of the system (100), a limited number of user inputs may be enabled to let the user influence and control the system and the classification process.

14 Claims, 6 Drawing Sheets

(52) U.S. Cl.
CPC .............. *G06T7/0083* (2013.01); *G06T 7/0089* (2013.01); *G06T 2207/10072* (2013.01); *G06T 2207/30041* (2013.01)

(56) References Cited

U.S. PATENT DOCUMENTS

| | | | |
|---|---|---|---|
| 2007/0112585 A1* | 5/2007 | Breiter et al. ................... | 705/2 |
| 2007/0116338 A1 | 5/2007 | Fidrich et al. | |
| 2007/0258630 A1 | 11/2007 | Tobin et al. | |
| 2008/0005105 A1 | 1/2008 | Lawler et al. | |
| 2008/0253654 A1* | 10/2008 | Delong ......................... | 382/173 |

FOREIGN PATENT DOCUMENTS

| | | |
|---|---|---|
| WO | 03023717 A2 | 3/2003 |
| WO | 2007035688 A2 | 3/2007 |
| WO | 2007079207 A2 | 7/2007 |
| WO | 2007110420 A2 | 10/2007 |

OTHER PUBLICATIONS

Liu, J., et al.; Three dimensional digital atlas of the orbit constructed from multi-modal radiological images; Jan. 2007; Intl. Journal of Computer Assisted Radiology and Surgery; pp. 275-283.

Lowe, H. J., et al.; Towards Knowledge-Based Retrieval of Medical Images. The Role of Semantic Indexing, Image Content Representation and Knowledge-Based Retrieval; 1998; Proc. AMIA Symp.; pp. 882-886.

Mojsilovic, A., et al.; Semantic Based Categorization, Browsing and Retrieval in Medical Image Databases; 2002; IEEE ICIP; pp. III-145-III-148.

Perner, P.; Image mining: issues, framework, a generic tool and its application to medical-image diagnosis; 2002; Engineering Applications of Artificial Intelligence; 15:205-216.

Peters, J., et al.; Segmentation of the heart and major vascular structures in cardiovascular CT images; 2008; Proc. SPIE Medical Imaging.

Peters, J., et al.; Automatic whole heart segmentation in static magnetic resonance imaging volumes; 2007; Proc. MICCAI, LNCS; 4792:402-410.

Walker, M.J., et al.; Comparison of two initialization methods for automatic, whole-heart, model-based segmentation of multiphase cardiac MSCT images; 2006; Int. Journal Cardiovascular Imaging; 22:p. 12.

* cited by examiner

IMAGE CLASSIFICATION BASED ON IMAGE
SEGMENTATION

CROSS REFERENCE TO RELATED
APPLICATIONS

This application claims the benefit of U.S. provisional application Ser. No. 61/053,123 filed May 14, 2008, which is incorporated herein by reference.

FIELD OF THE INVENTION

The invention relates to classifying image data and, more particularly, to classifying image data on the basis of a model for adapting to an object in the image data.

BACKGROUND OF THE INVENTION

Radiologists are faced with ever increasing workloads resulting from the ever increasing number of images to be analyzed, classified and described. Classifying image data may be useful, for example, for image data retrieval. Nowadays, a class of image data is typically based on the acquisition modality, e.g. CT, part of the anatomy represented by the image data, e.g. chest, gender and age group of the patient, e.g. male, young adult, and objects described by the image data. Description of the anatomy represented by the image data is particularly time consuming and often requires studying many images rendered based on acquired image data. The rendered images are viewed and described by radiologists. In order to assist a radiologist in his tasks, software implemented image analysis systems are available. Many software packages provide interactive tools for measuring objects in the image. For example, the user may select two points on the wall of a blood vessel for computing a distance between the two points, yielding the diameter of the vessel. Other systems include image segmentation systems for delineating features such as edges and surfaces in images and measuring tools for measuring objects in the image data on the basis of the image segmentation. For example, WO 2003/023717 entitled Automated Measurement of Geometrical Properties describes a method of measuring a geometric parameter of a three-dimensional structure contained in an object, using model-based image segmentation. First, a first model is adapted to an object in the image data. Then, a second model is fitted to the adapted first model by adjusting the value of the geometric parameter of the second model. For example, the second model may be a sphere and the geometric parameter may be the sphere diameter. The first model may be a triangular mesh for adapting to a femur bone depicted in the image data. The sphere may be fitted to the femur head. After obtaining necessary parameter values, the radiologist is required to describe the findings and/or classify the image data based on the findings. Typically this is done by dictating a description and using speech recognition techniques for converting speech to text.

SUMMARY OF THE INVENTION

It would be advantageous to provide means for classifying image data which would require fewer inputs from a radiologist.

Thus, in an aspect, the invention provides a system for classifying image data on the basis of a model for adapting to an object in the image data, the system comprising a segmentation unit for segmenting the image data by adapting the model to the object in the image data; and a classification unit for assigning a class to the image data on the basis of the model adapted to the object in the image data, thereby classifying the image data, wherein the classification unit comprises an attribute unit for computing a value of an attribute of the model on the basis of the model adapted to the object in the image data, and wherein the assigned class is based on the computed value of the attribute.

Thus, the system of the invention is capable of classifying the image data without any user input. All inputs required for classifying the image data constitute a model for adapting to an object in the image data. A person skilled in the art will understand, however, that in some embodiments, a limited number of user inputs, e.g., an input for selecting a model for adapting to an object in the image data, may be enabled to let the user influence and control the system and the classification process.

In an embodiment of the system, the attribute of the model is defined based on the model or based on a user attribute input. The classification unit of the system is arranged to employ the attribute unit for computing the value of the attribute. The attribute whose value is to be computed may be defined based on the model. For example, if the model comprises a mesh for adapting to the object in the image, the model may further specify two vertices. The two vertices may define an attribute of the mesh—the distance between said vertices. The attribute unit may be arranged for computing the value of the distance between the specified vertices of the adapted mesh. Such an attribute is determined based on the model. Alternatively, it may be useful to let the user provide a user attribute input, e.g., for indicating two vertices of the model mesh. The two vertices may define an attribute of the mesh—the distance between said vertices. The attribute unit may be arranged for computing the value of the distance between the indicated vertices of the adapted mesh. Such an attribute is determined based on the user attribute input.

Those skilled in the art will understand that it is possible that certain attributes do not require to be defined either by the model or by a user attribute input. For example, the system may comprise an attribute unit for computing the value of the distance between every two vertices of the mesh. The attribute unit may be further arranged for selecting the largest value. Such an attribute—the diameter of the smallest sphere containing all vertices of the model mesh—can be computed for every mesh and does not require to be defined either by the model or by the user attribute input. The system may be arranged to routinely compute the value of such an attribute.

In an embodiment of the system, the value of the attribute of the model is a text for classifying the image data. A text-valued attribute may be easier to understand and interpret for users. An example of a text-valued attribute is the type of a breast nodule detected in an X-ray image which may assume values "malignant" or "benign". The value may be assigned based on the brightness of the segmented nodule after injection of a contrast agent. Since malignant tumors develop their own blood supply system, they appear brighter in an X-ray image than benign nodules. Nodules having a brightness above a threshold may be classified as malignant.

In an embodiment of the system, the value of the attribute of the model is at least one number for classifying the image data. As discussed above, the attribute may be the distance between two vertices of the model mesh.

In an embodiment of the system, the value of the attribute of the model is a range or a vector for classifying the image data. For example, a vector-valued attribute may describe the main principal axis of the inertia tensor of a structure, e.g., a vertebra. An exemplary range-valued attribute is a percent range of the stenosis of an artery by arterial plaque.

In an embodiment, the system further comprises a description unit for creating a description based on the class assigned to the image data. The description may comprise both text and numerical data derived from the class assigned to the image. The description unit may be arranged to use a vocabulary and grammar rules for building syntactically correct sentences. The description may be used for creating reports, for example.

In an embodiment of the system, the segmentation unit is further arranged for segmenting second image data by adapting the model to a second object in the second image data, the classification unit is further arranged for assigning a second class to the second image data on the basis of the model adapted to the second object in the second image data, thereby classifying the second image data, and the system further comprises a comparison unit for comparing the class assigned to the image data with the second class assigned to the second image data to determine a correspondence between the image data and the second image data. The correspondence may be based on a similarity of the image data and the second image data. Alternatively, the correspondence may be based on complementarity of the image data and the second image data.

In an embodiment, the system further comprises a second comparison unit for comparing the class assigned to the image data with a data record to determine a correspondence between the image data and the data record. The data record may be, for example, an entry from a handbook or an encyclopedia.

In an embodiment, the system further comprises a second classification unit for assigning a data record class to the data record, thereby classifying the data record, and wherein the second comparison unit is arranged for comparing the class assigned to the image data with the data record class assigned to the data record.

In a further aspect of the invention, the system according to the invention is comprised in a database system. The database comprises items. Each data record is assigned a data record class. The query for retrieving a data record from the database is determined based on the class assigned by the system to the image data. The system is adapted for identifying the data record that is similar or complementary to the image by comparing the class assigned to the image with the class assigned to the data record.

In a further aspect, the system according to the invention is comprised in an image acquisition apparatus.

In a further aspect, the system according to the invention is comprised in a workstation.

In a further aspect, the invention provides a method of classifying image data on the basis of a model for adapting to an object in the image data, the method comprising a segmentation step for segmenting the image data by adapting the model to the object in the image data; and a classification step for assigning a class to the image data on the basis of the model adapted to the object in the image data, thereby classifying the image data, wherein the classification step comprises an attribute step for computing a value of an attribute of the model on the basis of the model adapted to the object in the image data, and wherein the assigned class is based on the computed value of the attribute.

In a further aspect, the invention provides a computer program product to be loaded by a computer arrangement, the computer program comprising instructions for classifying image data on the basis of a model for adapting to an object in the image data, the computer arrangement comprising a processing unit and a memory, the computer program product, after being loaded, providing said processing unit with the capability to carry out steps of the method.

It will be appreciated by those skilled in the art that two or more of the above-mentioned embodiments, implementations, and/or aspects of the invention may be combined in any way deemed useful.

Modifications and variations of the database system, of the image acquisition apparatus, of the workstation, of the method, and/or of the computer program product, which correspond to the described modifications and variations of the system, can be carried out by a person skilled in the art on the basis of the present description.

A person skilled in the art will appreciate that the method may be applied to multidimensional image data, e.g., 2-dimensional (2-D), 3-dimensional (3-D) or 4-dimensional (4-D) image data, acquired by various acquisition modalities such as, but not limited to, X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

BRIEF DESCRIPTION OF THE DRAWINGS

These and other aspects of the invention will become apparent from and will be elucidated with respect to the implementations and embodiments described hereinafter and with reference to the accompanying drawings, wherein.

Identical reference numerals are used to denote similar parts throughout the Figures.

DETAILED DESCRIPTION OF EMBODIMENTS

Figure 1:
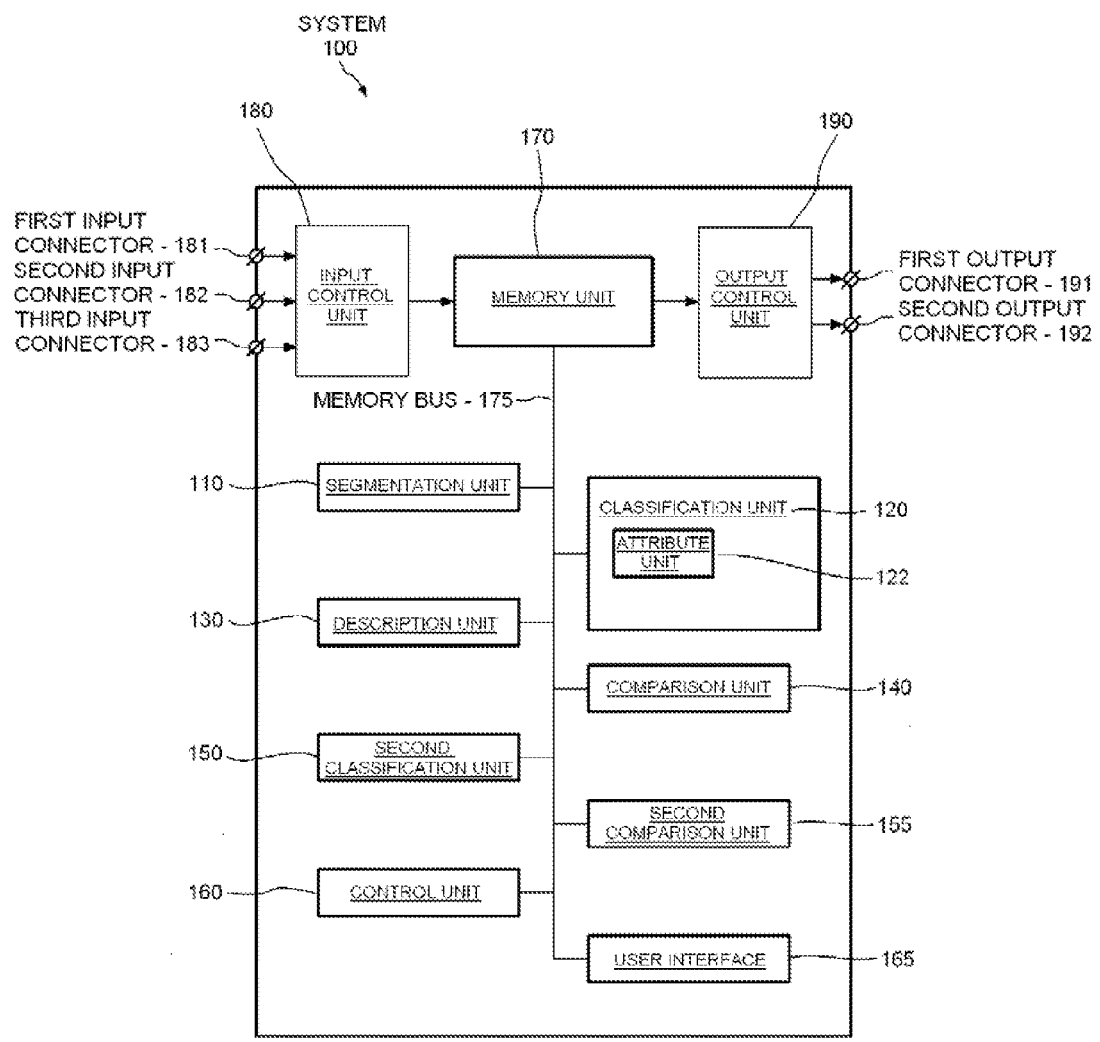
FIG. 1 shows a block diagram of an exemplary embodiment of the system.

FIG. 1 schematically shows a block diagram of an exemplary embodiment of the system 100 for classifying image data on the basis of a model for adapting to an object in the image data, the system comprising:

a segmentation unit 110 for segmenting the image data by adapting the model to the object in the image data; and a classification unit 120 for assigning a class to the image data on the basis of the model adapted to the object in the image data, thereby classifying the image data, wherein the classification unit comprises an attribute unit 122 for computing a value of an attribute of the model on the basis of the model adapted to the object in the image data, and wherein the assigned class is based on the computed value of the attribute.

The exemplary embodiment of the system 100 further comprises the following optional units:

a description unit 130 for creating a description based on the class assigned to the image data;

a comparison unit 140 for comparing the class assigned to the image data with the second class assigned to the second image data to determine a correspondence between the image data and the second image data;

a second classification unit 150 for assigning a data record class to the data record, thereby classifying the data record;

a second comparison unit 155 for comparing the class assigned to the image data with a data record to determine a correspondence between the image data and the data record;

a control unit 160 for controlling the work of the system 100;

a user interface 165 for communication between the user and the system 100; and a memory unit 170 for storing data.

In an embodiment of the system 100, there are three input connectors 181, 182 and 183 for the incoming data. The first input connector 181 is arranged to receive data coming in from a data storage means such as, but not limited to, a hard disk, a magnetic tape, a flash memory, or an optical disk. The second input connector 182 is arranged to receive data coming in from a user input device such as, but not limited to, a mouse or a touch screen. The third input connector 183 is arranged to receive data coming in from a user input device such as a keyboard. The input connectors 181, 182 and 183 are connected to an input control unit 180.

In an embodiment of the system 100, there are two output connectors 191 and 192 for the outgoing data. The first output connector 191 is arranged to output the data to a data storage means such as a hard disk, a magnetic tape, a flash memory, or an optical disk. The second output connector 192 is arranged to output the data to a display device. The output connectors 191 and 192 receive the respective data via an output control unit 190.

A person skilled in the art will understand that there are many ways to connect input devices to the input connectors 181, 182 and 183 and the output devices to the output connectors 191 and 192 of the system 100. These ways comprise, but are not limited to, a wired and a wireless connection, a digital network such as, but not limited to, a Local Area Network (LAN) and a Wide Area Network (WAN), the Internet, a digital telephone network, and an analog telephone network.

In an embodiment of the system 100, the system 100 comprises a memory unit 170. The system 100 is arranged to receive input data from external devices via any of the input connectors 181, 182, and 183 and to store the received input data in the memory unit 170. Loading the input data into the memory unit 170 allows quick access to relevant data portions by the units of the system 100. The input data may comprise, for example, the image data and model data. The memory unit 170 may be implemented by devices such as, but not limited to, a Random Access Memory (RAM) chip, a Read Only Memory (ROM) chip, and/or a hard disk drive and a hard disk. The memory unit 170 may be further arranged to store the output data. The output data may comprise, for example, the class assigned to the image. Optionally, the output data may further comprise the model adapted to the object in the image data and/or the value of the attribute. The memory unit 170 may be also arranged to receive data from and/or deliver data to the units of the system 100 comprising the segmentation unit 110, the classification unit 120, the attribute unit 122, the description unit 130, the comparison unit 140, the second classification unit 150, the second comparison unit 155, the control unit 160, and the user interface 165, via a memory bus 175. The memory unit 170 is further arranged to make the output data available to external devices via any of the output connectors 191 and 192. Storing data from the units of the system 100 in the memory unit 170 may advantageously improve performance of the units of the system 100 as well as the rate of transfer of the output data from the units of the system 100 to external devices.

Alternatively, the system 100 may comprise no memory unit 170 and no memory bus 175. The input data used by the system 100 may be supplied by at least one external device, such as an external memory or a processor, connected to the units of the system 100. Similarly, the output data produced by the system 100 may be supplied to at least one external device, such as an external memory or a processor, connected to the units of the system 100. The units of the system 100 may be arranged to receive the data from each other via internal connections or via a data bus.

In an embodiment of the system 100, the system 100 comprises a control unit 160 for controlling the system 100. The control unit may be arranged to receive control data from and provide control data to the units of the system 100. For example, after adaptation of the model to the image data, the segmentation unit 110 may be arranged to provide control data "the image data is segmented" to the control unit 160 and the control unit 160 may be arranged to provide control data "classify the image data" to the classification unit 120. Alternatively, a control function may be implemented in another unit of the system 100.

In an embodiment of the system 100, the system 100 comprises a user interface 165 for communication between a user and the system 100. The user interface 165 may be arranged to receive a user input for selecting the model for adapting to the object in the image data. The user interface may further provide means for displaying a view of the mesh adapted to the object. Optionally, the user interface may receive a user input for selecting a mode of operation of the system such as, e.g., for defining the terms of the external or internal energy expression, or a pre-positioning method. A person skilled in the art will understand that more functions may be advantageously implemented in the user interface 165 of the system 100.

Figure 2:
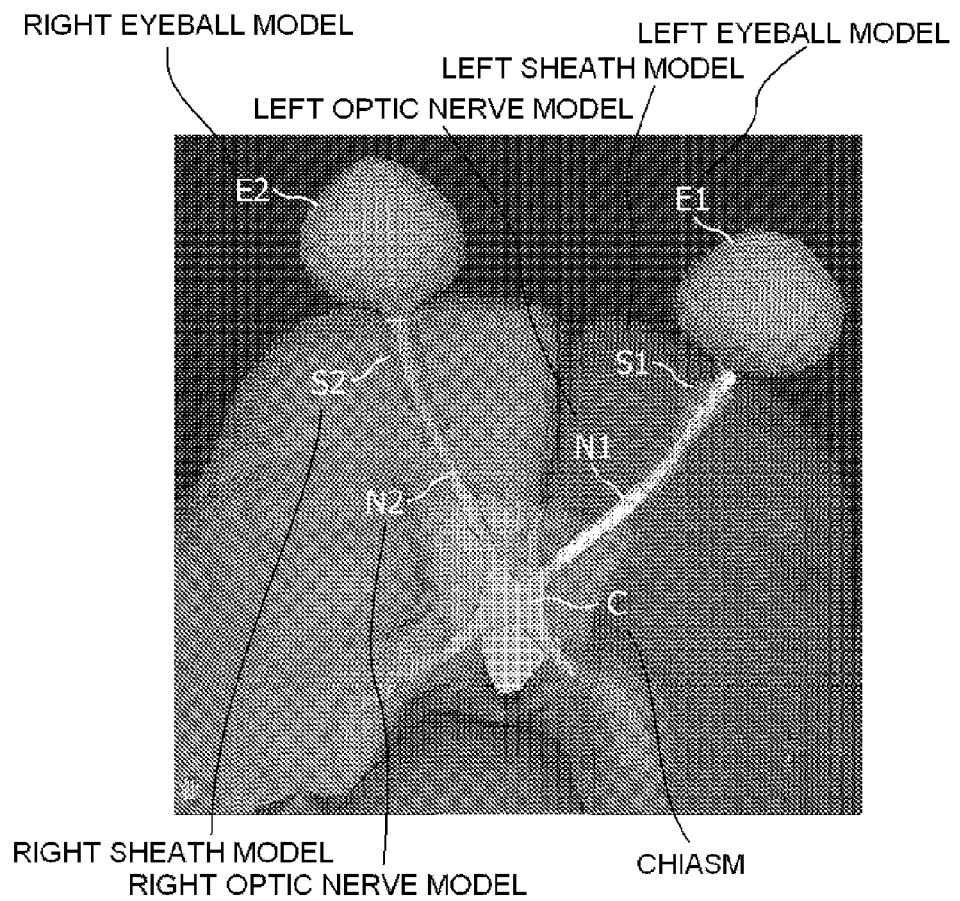
FIG. 2 illustrates segmentation of the optic nerves.

In an embodiment, the system of the invention is arranged for classifying image data describing the optic nerves. FIG. 2 illustrates segmentation of the left and right optic nerve using a left N1 and right N2 optic nerve model. Each optic nerve comprises a bundle of fibers for transmitting electrical impulses from the retina to the brain. The left and right optic nerves leave the respective eyeballs, modeled by respective eyeball models E1 and E1, via the optic canals and run towards the chiasm, modeled by a chiasm model C, where there is a partial crossing of fibers of both optic nerves. A segment of each optic nerve at each eyeball is protected by a sheath modeled by a left model S1 and a right sheath model S2. The typical diameter of the optic nerve increases from about 1.6 mm inside the eyeball to 3.5 mm at the eyeball orbit and further to 4.5 mm within the cranial space.

In an embodiment, the models N1, N2, E1, E2, and C are mesh surface models. A mesh model suitable for modeling an optic nerve is described in SPIE Medical Imaging, Conference 6914 Image Processing, Session 7, Segmentation of the heart and major vascular structures in cardiovascular CT images, Jochen Peters, Olivier Ecabert, Cristian Lorenz, Jens von Berg, Matthew J. Walker, Mani Vembar, Mark E. Olszewski, Jürgen Weese, San Diego 18 Feb. 2008, to appear in Proceedings SPIE Medical Imaging 2008: Image Processing, J. M. Reinhardt and J. P. Pluim, eds., hereinafter referred to as Ref. 1. Each optic nerve is modeled by a stack of consecutive rings, as described in more detail in section 2.3 of Ref 1. Each ring is defined by a fixed number of vertices. The vertices of two consecutive rings are connected with edges forming a segment mesh with triangular faces. The triangular mesh for modeling the optic nerve is placed in the image data space and adapted to the optic nerve in the imaged data. The placement may be based on detection of the nerve or of a reference structure in the image data using, for example, the generalized Hough transform. A method of placing a mesh using the generalized Hough transform is described in M. J. Walker, A. Chakrabarty, M. E. Olszewski, O. Ecabert, J. Peters, C. Lorenz, J. von Berg, M. Vembar, K. Subramanyan, and J. Weese, "Comparison of two initialization methods for automatic, whole-heart, model-based segmentation of multiphase cardiac MSCT images," in Proc. 1st Annual Scientific Meeting Soc. Cardiovascular Computed Tomography, Int. Journal Cardiovascular Imaging, 22 (suppl. 1), p. 12, July 2006. The adaptation of the initialized mesh employs the method described, for example, in J. Peters, O. Ecabert, C. Meyer, H. Schramm, R. Kneser, A. Groth, and J. Weese, "Automatic whole heart segmentation in static magnetic resonance image volumes," in Proc. MICCAI, N. Ayache, S. Ourselin, and A. Maeder, eds., LNCS 4792, pp. 402-410, Springer, 2007. Each sheath of the optic nerve is modeled using an approach similar to that used to model the optic nerve.

In an embodiment, the models of the two optic nerve models N1 and N2 and of the two sheath models S1 and S2 are attached to the respective eyeball models E1 and E2 and the chiasm model C which is further attached to other structures of the central nervous system. Such a comprehensive model comprising multiple parts is adapted to the structures in the image data. Alternatively, the component models can be adapted one after another with models of reference structures, such as the two hemispheres and eyeballs being adapted before the adaptation of the optic nerve models N1 and N2 and the sheath models S1 and S2 attached to the eyeball models E1 and E2 and the chiasm model C. Those skilled in the art will understand that there are other models and methods of adapting such models to objects in the image data which may be used by the system according to the invention. The models and methods described above illustrate embodiments of the system and must not be construed as limiting the scope of the claims.

Figure 3:
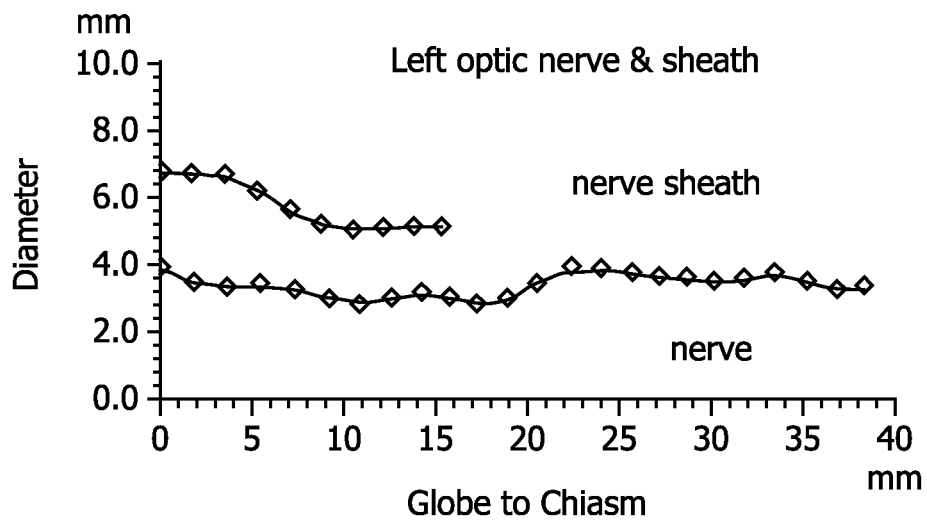
FIG. 3 shows the variation of the diameter of the left optic nerve model and the left sheath model along the left optic nerve.

In an embodiment, the image data is classified based on the state of the left optic nerve. In more detail, the image data is classified based on two attributes of the left optic nerve model N1 adapted to the left optic nerve in the image data: the diameter of the left optic nerve model N1 and the mean intensity of the left optic nerve model N1. The value of the diameter and the mean gray value are determined for each ring of the stack of rings used to model the left optic nerve. The diameter $d_i$ of the i-th ring of the left optic nerve model N1 is computed for each adapted ring, using the formula $A_i = \pi (d_i/2)^2$ where $A_i$ is the area of the ring. The area of the ring is approximated by the area of the polygon defined by the vertices of the ring. The location of each ring is defined by the distance of the ring center from the surface of the left eyeball model measured along the centerline. This distance of each ring is approximated by the sum of distances of the centers of consecutive rings between the ring in question and the ring adjacent to the eyeball. The center of each ring is defined as the mass center of the vertices of the ring. The diameter of the sheath model S1 may be computed in an analogous way. FIG. 3 shows the variation of the diameter of the left optic nerve model N1 and the left sheath model S1 along the left optic nerve.

Figure 4:
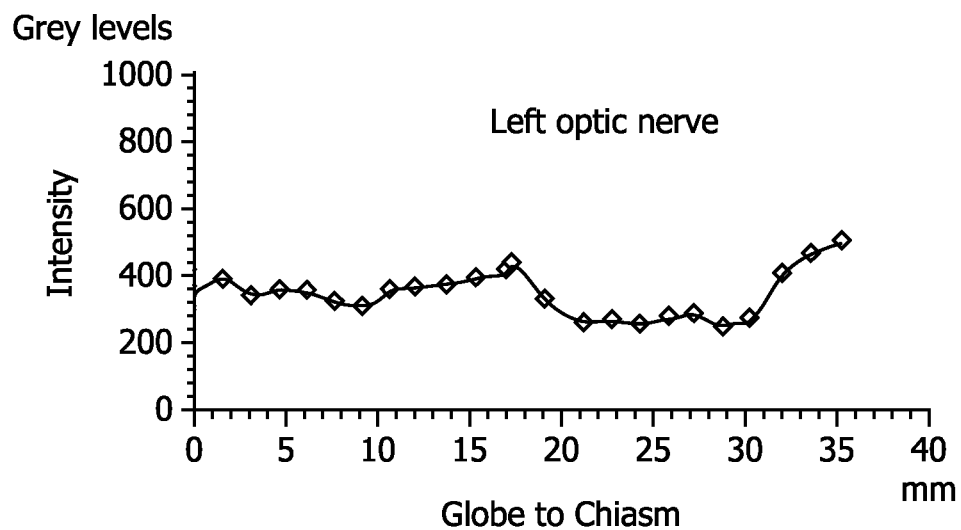
FIG. 4 shows the variation of the intensity determined on the basis of the left optic nerve model along the left optic nerve.

The mean gray value of the i-th ring of the left optic nerve model N1 is computed from the gray values of sampling points. The sampling points are points selected at equal distances on each semi-line originating at the ring center and extending towards a vertex of the ring. The histogram of the gray values at these sampling points shows two large maxima at gray values $I_{0,i}$ and $J_{0,i}$, where i is the ring index. The larger of the two gray values, denoted $I_{0,i}$, approximates the mean intensity of the optic nerve at the location corresponding to the location of the i-th ring. The smaller of the two gray values, denoted $J_{0,i}$, approximates the mean intensity of the sheath at the location corresponding to the location of the i-th ring. FIG. 4 shows the variation of the intensity determined on the basis of the left optic nerve model N1 along the left optic nerve.

In an embodiment of the system, there are two attributes of the left optic nerve model used for defining the class of the image data. The first attribute is the graph of the diameter of the optic nerve and the second attribute is the graph of the mean intensity of the optic nerve model. It is worth pointing out that although the second attribute is defined based on the optic nerve model, the value of the second attribute is further based on the gray values of the image data. The two graphs may be represented by a table comprising locations along the optic nerve (i.e., coordinates of the centers of mass of the rings) and the corresponding values of the diameter of the optic nerve and the mean intensity of the optic nerve. The values of the diameter and the mean intensity may be quantized to limit the number of classes. In the present context, quantization means replacing each value from a range of values with one value, e.g. the smallest value or the largest value from the range of values or the mean of said smallest and largest value. Optionally, the values of the graph may be text values such as "high", "low" or "medium", based on the mean value of the diameter, for example.

In an embodiment, the graph of the left optic nerve diameter is further processed and the image data is classified based on the results of the processing of the graph:

a smoothing filter is applied to the sequence of diameter values $d_{0,i}$ to reduce artifacts of segmentation; for example a moving average filter can be used; the output of this step are smoothed diameter values $d_{1,i}$ the maximum value M and minimum value m of the smoothed diameter values $d_{1,i}$ are computed and the diameter values are normalized, e.g. by subtracting the minimum m from each value and dividing the obtained value by the M−m; the output of this step are normalized diameter values $d_{2,i}$;

the first derivative of the normalized diameter values $d_{2,i}$ is computed; the output of this step are first derivative values $D_{2,i}$;

a positive threshold value t is computed on the basis of the first derivative values $D_{2,i}$; this threshold is used to quantize the first derivative values $D_{2,i}$ as follows:

if $-t < D_{2,i} < t$, $D_{2,i}$ is replaced with 0;
if $D_{2,i} > t$, $D_{2,i}$ is replaced with 1;
if $D_{2,i} < -t$, $D_{2,i}$ is replaced with −1;

the output of this step are quantized first derivative values $D_{3,i}$;

a smoothing filter is applied to the quantized derivative values $D_{3,i}$; for example, a moving average filter can be used; the output of this step are smoothed derivative values $D_{4,i}$;

a second positive threshold value s is computed on the basis of the smoothed derivative values $D_{4,i}$; this threshold is used to quantize the smoothed derivative values $D_{4,i}$ as follows:

if $-s < D_{4,i} < s$, $D_{4,i}$ is replaced with 0;
if $D_{4,i} > s$, $D_{4,i}$ is replaced with 1;
if $D_{4,i} < -s$, $D_{4,i}$ is replaced with −1;

the output of this step are quantized smoothed derivative values $D_{5,i}$.

The sequence −1 . . . 0 . . . 1 in the quantized smoothed derivative values $D_{5,i}$ indicates enlarged nerve, and thus this sequence is referred to as enlarged nerve sequence. The sequence 1 . . . 0 . . . −1 in the quantized smoothed derivative values $D_{5,i}$ indicates thinned nerve, and thus this sequence is referred to as thinned nerve sequence. Consequently, image data depicting an optic nerve comprising an enlarged sequence is classified as enlarged, and image data depicting an optic nerve comprising a thinned nerve sequence is classified as thinned. Image data depicting an optic nerve comprising no enlarged nerve sequence and no thinned nerve sequence is classified as normal. Image data depicting an optic nerve comprising both an enlarged nerve sequence and a thinned nerve sequence may be classified either as enlarged or thinned. Optionally, a classification comprising multiple values, e.g. enlarged, thinned, may be used.

In an embodiment, the graph of the left optic nerve mean intensity is further processed and the image data is classified based on the results of the processing of the graph:

a smoothing filter is applied to the sequence of mean intensity values $I_{0,i}$ to reduce artifacts of segmentation; for example a moving average filter can be used; the output of this step are smoothed intensity values $I_{1,i}$ the maximum value M and minimum value m of the smoothed mean intensity values $I_{1,i}$ are computed and the gray values are normalized, e.g. by subtracting the minimum m from each value and dividing the obtained value by M−m; the output of this step are normalized intensity values $I_{2,i}$;

the first derivative of the normalized mean intensity values $I_{2,i}$ is computed; the output of this step are first derivative values $D_{2,i}$;

a positive threshold value t is computed on the basis of the first derivative values $D_{2,i}$; this threshold is used to quantize the first derivative values $D_{2,i}$ as follows:

if $-t < D_{2,i} < t$, $D_{2,i}$ is replaced with 0;
if $D_{2,i} > t$, $D_{2,i}$ is replaced with 1;
if $D_{2,i} < -t$, $D_{2,i}$ is replaced with −1;

the output of this step are quantized first derivative values $D_{3,i}$;

a smoothing filter is applied to the quantized derivative values $D_{3,i}$; for example, a moving average filter can be used; the output of this step are smoothed derivative values $D_{4,i}$;

a second positive threshold value s is computed on the basis of the smoothed derivative values $D_{4,i}$; this threshold is used to quantize the smoothed derivative values $D_{4,i}$ as follows:

if $-s < D_{4,i} < s$, $D_{4,i}$ is replaced with 0;
if $D_{4,i} > s$, $D_{4,i}$ is replaced with 1;
if $D_{4,i} < -s$, $D_{4,i}$ is replaced with −1;

the output of this step are quantized smoothed derivative values $D_{5,i}$.

The sequence −1 . . . 0 . . . 1 in the quantized smoothed derivative values $D_{5,i}$ indicates hypointensity, and thus this sequence is referred to as hypointensity sequence. The sequence 1 . . . 0 . . . −1 in the quantized smoothed derivative values $D_{5,i}$ indicates hyperintensity, and thus this sequence is referred to as hyperintensity sequence. Consequently, image data depicting an optic nerve comprising a hypointensity sequence is classified as hypointense, and image data depicting an optic nerve comprising a hyperintensity sequence is classified as hyperintense. Image data depicting an optic nerve comprising no hypointensity sequence and no hyperintensity sequence is classified as isointense. Image data depicting an optic nerve comprising both a hypointensity sequence and a hyperintensity sequence may be classified either as hyperintense or hypointense. Optionally, a classification comprising multiple values, e.g. hypointense, hyperintense, may be used.

The mean intensity graph shown in FIG. 4 reveals a hypointense image data comprising an optic nerve detected using the filters described above. It is worth pointing out that due to MR bias fields, the grey level of the optic nerve increases from the globe to the chiasm. The use of filters allows for a correct classification of the image data.

Table 1 illustrates a classification scheme for classifying image data, based on the diameter and intensity attributes of the left optic nerve model adapted to the left optic nerve in the image data.

| Attribute | Attribute value |
|---|---|
| diameter | enlarged |
|  | normal |
|  | thinned |
| intensity | hyperintense |
|  | isointense |
|  | Hypointense |

Classifying an image may be very useful. Image data class descriptors may be used for describing images, for writing medical reports on findings based on the image data, for constructing queries for searching other databases. When the image data class and a class of a data record in a database are identical or satisfy certain condition, the data record can be retrieved as a data record corresponding to the image data.

In an embodiment of the system 100, a statistical distribution of the diameter values and/or intensity values for each ring is used for classifying the image data. The statistical distribution of the diameter and intensity values can be learned from a training set of image data in a training phase. Optionally, the system 100 may be adapted for carrying out such training. The classification unit may be arranged for comparing the computed diameter and intensity values with learned sequences indicating "abnormalities" and for computing the probability of occurrence of said abnormalities, or simply for classifying the image data as "normal" or "abnormal" based on probability thresholds.

Those skilled in the art will appreciate that the classification unit 120 of the system 100 may comprise a plurality of attribute units 122, each attribute unit 122 arranged for computing an attribute value based on the model adapted to the object in the image data. The plurality of computed attribute values defines a class of the image data. Optionally, the system 100 may further comprise a plurality of segmentation units 110 and a plurality of corresponding classification units 120. Each segmentation unit may employ its own segmentation method based on its own model. The attribute unit 122 of the corresponding classification unit 120 may be arranged to compute attribute values of the model employed by the segmentation unit 110.

In an embodiment of the system 100, the user may be enabled to select attributes to be used by the classification unit 120 to classify the image data. For example, if the user is interested in the diameter of the optic nerve, he may use the user interface 165 to indicate that the classification should be based exclusively on the diameter of the optic nerve model. In another situation, the user may be interested in classifying the image data based on both the diameter and the intensity of the optic nerve. Hence, he may instruct the system via the user interface to use both attributes of the optic nerve model for image data classification.

In an embodiment of the system 100, the segmentation unit 110 of the system 100 is further arranged for segmenting second image data by adapting the model to a second object in the second image data. The classification unit 120 is further arranged to assign a second class to the second image data on the basis of the model adapted to the second object in the second image data, thereby classifying the second image data. The image data, hereinafter referred to as the first image data, may be compared with the second image data on the basis of the class of the first image data, hereinafter referred to as the first class and the second class. The comparison is carried out by a comparison unit 140 to determine a correspondence between the first and second image data. The comparison unit 140 may be arranged for verifying that the first class and the second class satisfy a condition. If the condition is satisfied, the second image data is considered the corresponding image data. The condition may be the identity condition: the first image data corresponds to the second image data if the first class is identical with the second class. The condition may be a similarity condition: the first image data corresponds to the second image data if the first class is similar to the second class. The condition may be also a complementarity condition: the first image data corresponds to the second image data if the first class is complementary to the second class, like two jigsaw puzzle pieces.

The second image data may be image data from a database of image data. The first image data may be query image data. Finding the second image data which is similar to the first image data may be a very valuable tool for a physician, useful for diagnostics and treatment planning. Such a tool enables the physician to retrieve reference images from the database of image data.

In an embodiment, the system 100 further comprises a second comparison unit 155 for comparing the class assigned to the image data with a data record class assigned to a data record to determine a correspondence between the image data and the data record. The data record class may be already available in the database index. For example, the class of the image data may be defined by keywords such as "left optic nerve", "enlarged", and "hypointense". The second comparison unit 155 may be arranged to perform a keyword search for the keywords "left optic nerve", "enlarged", and "hypointense" in entries from a handbook of guidelines for a neurologist. If the number of hits in an entry exceeds a threshold, this entry is determined to be corresponding to the image data. Alternatively or additionally, the system 100 may further comprise a second classification unit 150 for assigning a data record class to the data record, thereby classifying the data record, and the second comparison unit 155 is arranged for comparing the class assigned to the image data with the data record class assigned to the data record. The second classification unit 150 may be, for example, a unit for classifying a specification of a hip implant from a catalogue of hip implants or second image data acquired using a modality different from the modality used to acquire the image data. Optionally, the second classification unit 150 may comprise a second segmentation unit for segmenting image data acquired using the other modality. Alternatively, the second classification unit 150 may be a unit for classifying another data record, e.g., an entry in an encyclopedia or in some guidelines.

A person skilled in the art will appreciate that the system 100 may be a valuable tool for assisting a physician in many aspects of her/his job. Further, although the embodiments of the system are illustrated using medical applications of the system, non-medical applications of the system are also contemplated.

Those skilled in the art will further understand that other embodiments of the system 100 are also possible. It is possible, among other things, to redefine the units of the system and to redistribute their functions. Although the described embodiments apply to medical images, other applications of the system, not related to medical applications, are also possible.

The units of the system 100 may be implemented using a processor. Normally, their functions are performed under the control of a software program product. During execution, the software program product is normally loaded into a memory, like a RAM, and executed from there. The program may be loaded from a background memory, such as a ROM, hard disk, or magnetic and/or optical storage, or may be loaded via a network like the Internet. Optionally, an application-specific integrated circuit may provide the described functionality.

Figure 5:
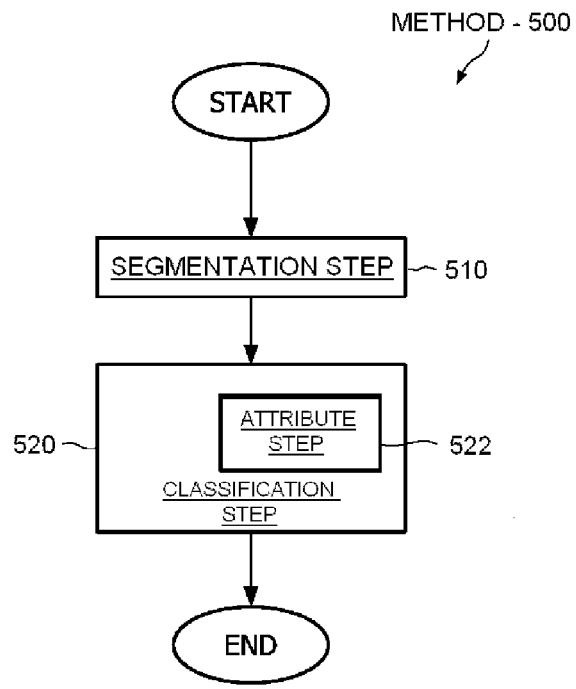
FIG. 5 shows a flowchart of an exemplary implementation of the method.

FIG. 5 shows a flowchart of an exemplary implementation of the method 500 of classifying image data on the basis of a model for adapting to an object in the image data. The method 500 begins with a segmentation step 510 for segmenting the image data by adapting the model to the object in the image data. After the segmentation step, the method 500 continues to a classification step 520 for assigning a class to the image data on the basis of the model adapted to the object in the image data, thereby classifying the image data, wherein the classification step 520 comprises an attribute step 522 for computing a value of an attribute of the model on the basis of the model adapted to the object in the image data, and wherein the assigned class is based on the computed value of the attribute.

After the classification step 520, the method 500 terminates.

A person skilled in the art may change the order of some steps or perform some steps concurrently using threading models, multi-processor systems or multiple processes without departing from the concept as intended by the present invention. Optionally, two or more steps of the method of the current invention may be combined into one step. Optionally, a step of the method of the current invention may be split into a plurality of steps. Optionally, the method 500 may further comprise a description step, a comparison step, a second classification step, and/or a second comparison step corresponding to the respective units of the system 100.

Figure 6:
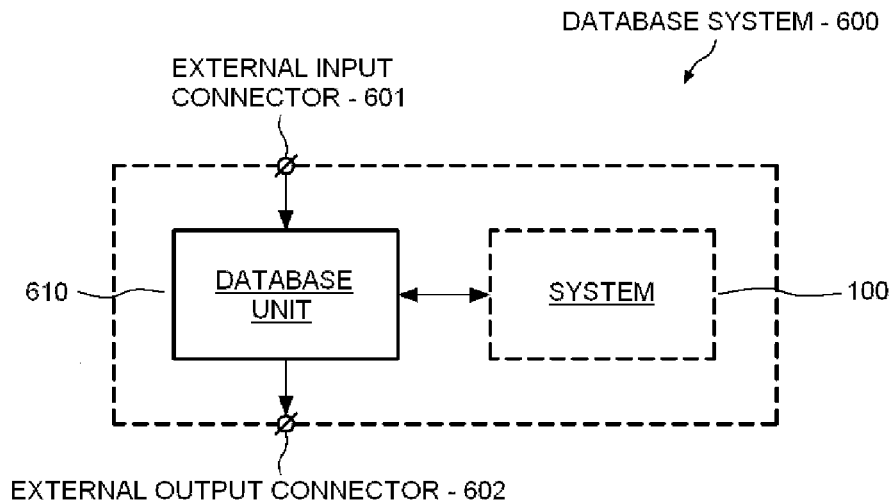
FIG. 6 schematically shows an exemplary embodiment of the database system.

FIG. 6 schematically shows an exemplary embodiment of the database system 600 employing the system 100 of the invention, said database system 600 comprising a database unit 610 connected via an internal connection to the system 100, an external input connector 601, and an external output connector 602. This arrangement advantageously increases the capabilities of the database system 600, providing said database system 600 with advantageous capabilities of the system 100.

Figure 7:
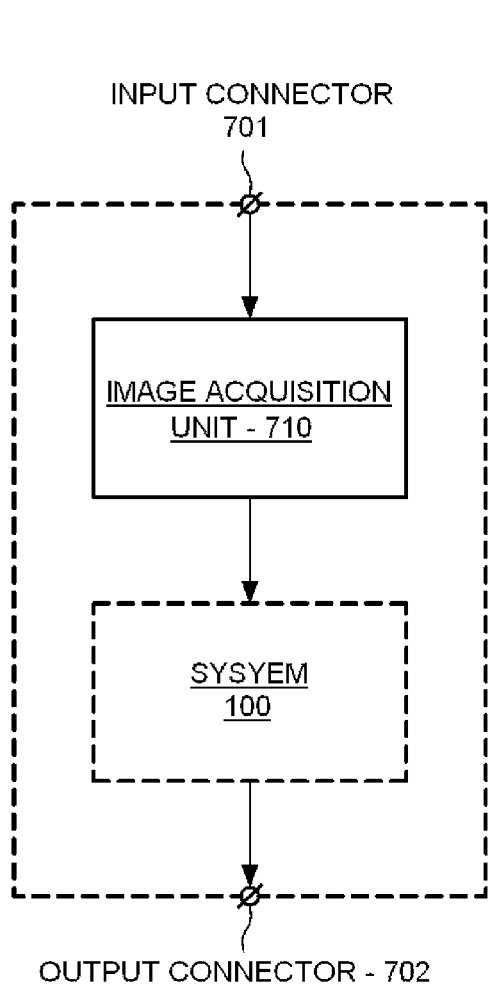
FIG. 7 schematically shows an exemplary embodiment of the image acquisition apparatus.

FIG. 7 schematically shows an exemplary embodiment of the image acquisition apparatus 700 employing the system 100 of the invention, said image acquisition apparatus 700 comprising an image acquisition unit 710 connected via an internal connection with the system 100, an input connector 701, and an output connector 702. This arrangement advantageously increases the capabilities of the image acquisition apparatus 700, providing said image acquisition apparatus 700 with advantageous capabilities of the system 100.

Figure 8:
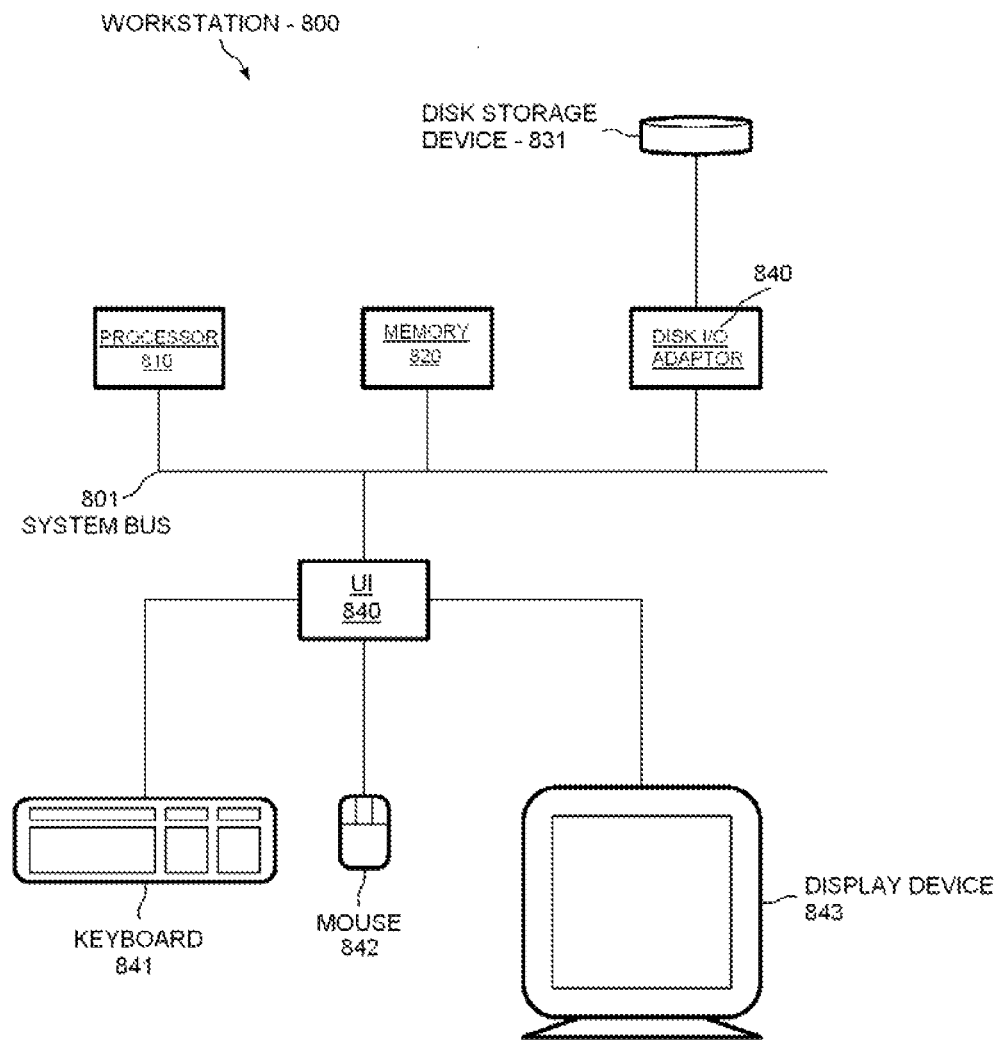
FIG. 8 schematically shows an exemplary embodiment of the workstation.

FIG. 8 schematically shows an exemplary embodiment of the workstation 800. The workstation comprises a system bus 801. A processor 810, a memory 820, a disk input/output (I/O) adapter 830, and a user interface (UI) 840 are operatively connected to the system bus 801. A disk storage device 831 is operatively coupled to the disk I/O adapter 830. A keyboard 841, a mouse 842, and a display 843 are operatively coupled to the UI 840. The system 100 of the invention, implemented as a computer program, is stored in the disk storage device 831. The workstation 800 is arranged to load the program and input data into memory 820 and execute the program on the processor 810. The user can input information to the workstation 800, using the keyboard 841 and/or the mouse 842. The workstation is arranged to output information to the display device 843 and/or to the disk 831. A person skilled in the art will understand that there are numerous other embodiments of the workstation 800 known in the art and that the present embodiment serves the purpose of illustrating the invention and must not be interpreted as limiting the invention to this particular embodiment.

It should be noted that the above-mentioned embodiments illustrate rather than limit the invention and that those skilled in the art will be able to design alternative embodiments without departing from the scope of the appended claims. In the claims, any reference signs placed between parentheses shall not be construed as limiting the claim. The word "comprising" does not exclude the presence of elements or steps not listed in a claim or in the description. The word "a" or "an" preceding an element does not exclude the presence of a plurality of such elements. The invention can be implemented by means of hardware comprising several distinct elements and by means of a programmed computer. In the system claims enumerating several units, several of these units can be embodied by one and the same record of hardware or software. The usage of the words first, second, third, etc., does not indicate any ordering. These words are to be interpreted as names.

The invention claimed is:

1. A system for classifying image data on the basis of a model for adapting to an object in the image data, the system comprising:
    a segmentation unit for segmenting the image data by adapting the model to the object in the image data; and
    a classification unit for assigning a class to the image data on the basis of the model adapted to the object in the image data, thereby classifying the image data,
wherein the classification unit comprises an attribute unit for computing a value of an attribute of the model on the basis of the model adapted to the object in the image data, and wherein the assigned class is based on the computed value of the attribute; and
    wherein, when the image data class and a data record satisfy predetermined conditions, the data record can be retrieved as a data record corresponding to the image.

2. A system as claimed in claim 1, wherein the attribute of the model is defined based on the model or based on a user attribute input.

3. A system as claimed in claim 1, wherein the value of the attribute of the model is a text for classifying the image data.

4. A system as claimed in claim 1, wherein the value of the attribute of the model is at least one number for classifying the image data.

5. A system as claimed in claim 4, wherein the value of the attribute of the model is a range or a vector for classifying the image data.

6. A system as claimed in claim 1, further comprising a description unit (130) for creating a description based on the class assigned to the image data.

7. A system as claimed in claim 1, wherein the segmentation unit is further arranged for segmenting second image data by adapting the model to a second object in the second image data, wherein the classification unit is further arranged for assigning a second class to the second image data on the basis of the model adapted to the second object in the second image data, thereby classifying the second image data, and wherein the system further comprises a comparison unit for comparing the class assigned to the image data with the second class assigned to the second image data to determine a correspondence between the image data and the second image data.

8. A system as claimed in claim 1, further comprising a second comparison unit for comparing the class assigned to the image data with a data record to determine a correspondence between the image data and the data record.

9. A system as claimed in claim 8, further comprising a second classification unit (150) for assigning a data record class to the data record, thereby classifying the data record, and wherein the second comparison unit is arranged for comparing the class assigned to the image data with the data record class assigned to the data record.

10. A database system comprising a system as claimed in any one of claims 7 to 9.

11. An image acquisition apparatus comprising a system as claimed in any one of claims 1 to 10.

12. A workstation comprising a system as claimed in any one of claims 1 to 10.

13. A method of classifying image data on the basis of a model for adapting to an object in the image data, the method comprising:
    a segmentation step for segmenting the image data by adapting the model to the object in the image data; and
    a classification step for assigning a class to the image data on the basis of the model adapted to the object in the image data, thereby classifying the image data,
wherein the classification step comprises an attribute step for computing a value of an attribute of the model on the basis of the model adapted to the object in the image data, and wherein the assigned class is based on the computed value of the attribute; and
    wherein, when the image data class and a data record satisfy predetermined conditions, the data record can be retrieved as a data record corresponding to the image.

14. A non-transitory computer readable medium to be loaded by a computer arrangement, comprising instructions for classifying image data on the basis of a model for adapting to an object in the image data, the computer arrangement comprising a processing unit and a memory, the computer program product, after being loaded, providing said processing unit with the capability to carry out steps of a method as claimed in claim 13.

* * * * *